Patented Jan. 12, 1937

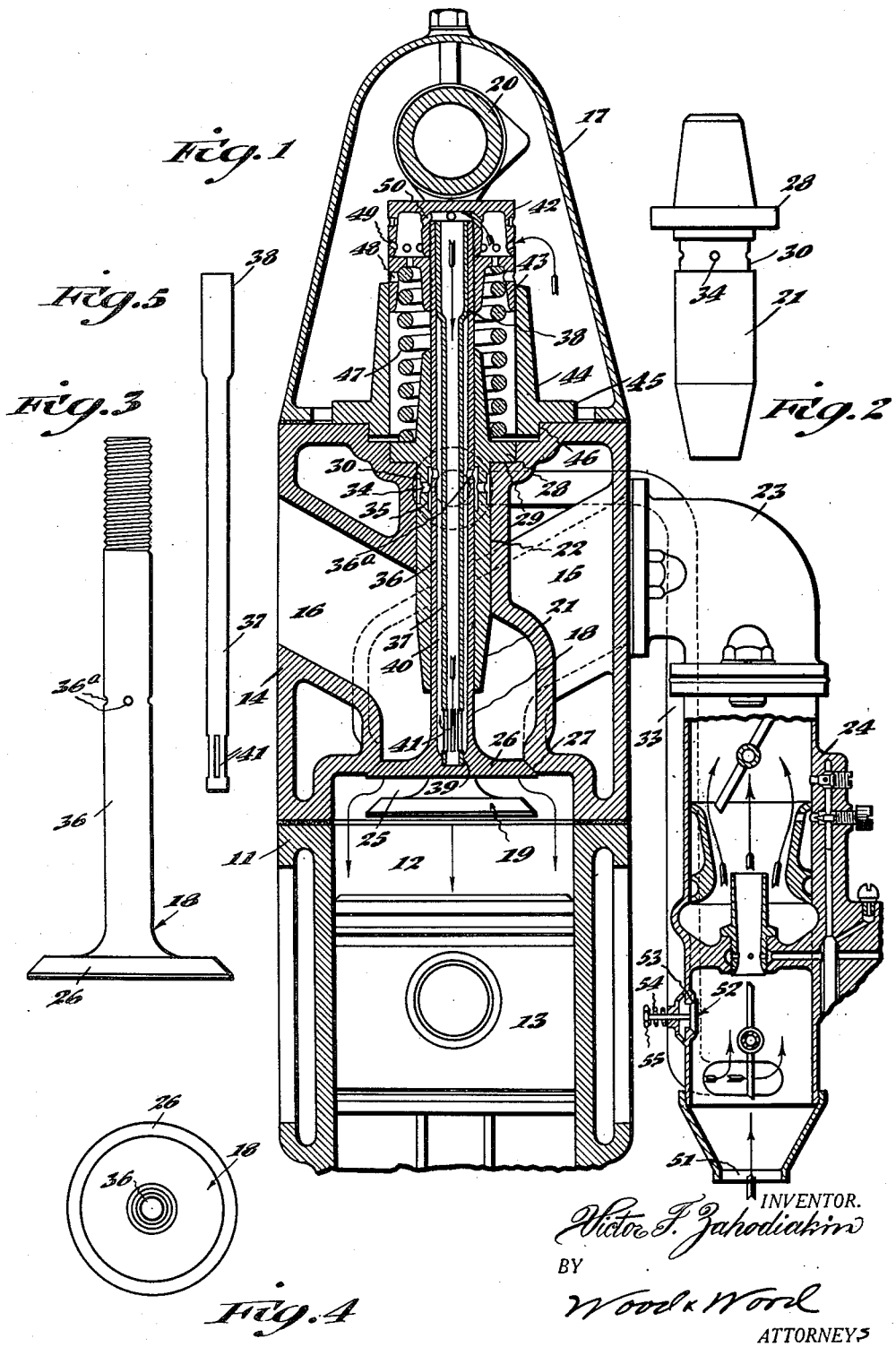

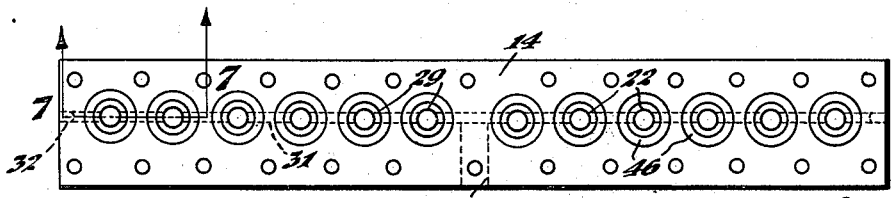
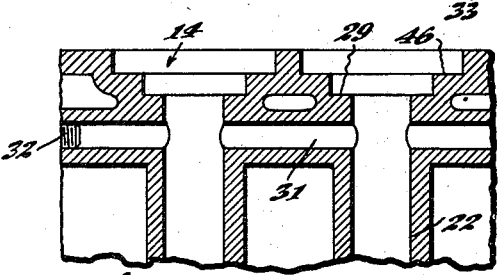
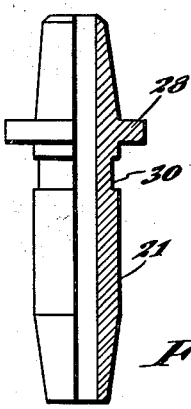
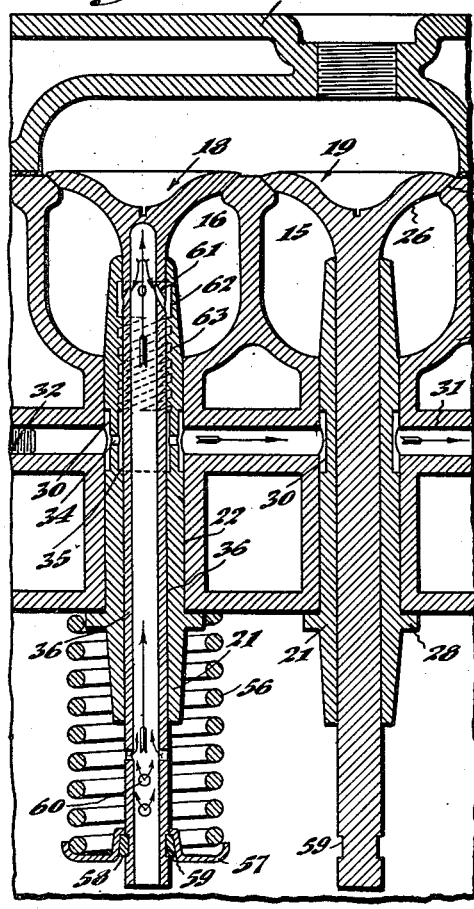
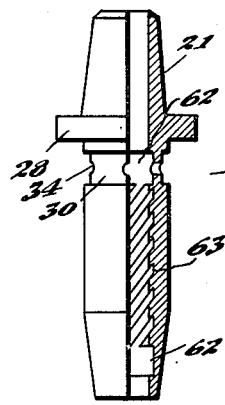

2,067,254

UNITED STATES PATENT OFFICE 2,067,254

INTERNAL COMBUSTION ENGINE

Victor F. Zahodiakin, Cincinnati, Ohio

Application May 27, 1932, Serial No. 613,963

5 Claims. (Cl. 123—177)

This invention relates to improvements in internal combustion engines and is particularly directed to structure embodied in the valves and associated therewith for the purpose of air cooling the valves, primarily the exhaust valves. The present invention is in the nature of a further development of the apparatus described and claimed in my co-pending application Serial No. 575,259, filed November 16, 1931, wherein air under pressure is supplied to the valve structure and guideway. The lowernig of the operating temperature of the valves eliminates detonation and vibration such as results from pre-ignition and is also effective for preventing oxidation and the formation of scale on the valve such as ordinarily occurs due to extreme heat, the elimination of these damaging actions being a material factor in lengthening the life of the valves.

It is the object of the present invention to provide a valve structure and embodiment of air circulating apparatus therewith wherein the intake or suction strokes of the motor drawing the gas from the carburetor to the cylinders are effective, by means of or through an intake connection, via the valve structure, guideway, and stem, for creating a rapid air draft or cooling current through and about the valve parts, particularly the valve head. This application consequently entails the provision of an improved valve structure achieving maximum cooling circulation of air about the valve parts which are subjected to the most extreme heat as the hot gases are expelled from the cylinders.

Another object of this invention is to provide a highly dependable automatic cooling apparatus for the exhaust valves of an internal combustion engine, which by virtue of the creation of the cooling current by the natural operation of the motor through proper connections assures constant air draft, this result being accomplished without the use of an auxiliary air compressor or suction creating instrumentality. Moreover it is provided that the suction created in the gas intake passageways or the carburetor draws the air from the valves to the carburetor and supplies the same for gas mixture in a preheated condition due to previous contact with the heated valves, consequently more efficiently mixing the gas as well as causing more perfect combustion in the cylinders.

It is a further object of this invention to provide an improved hollow valve structure wherein a material reduction in valve weight is achieved, thereby requiring less pressure in the valve spring which in turn results in less vibration and more silent operation. Moreover, it is provided that the suction passageways do not have any opening into the exhaust passageways from the cylinder or any open connection to the cylinder such as would permit entrance of foreign matter, particularly, the products of combustion discharged from the cylinders.

It is a still further object of this invention to provide a connection of the suction intake, extended through the valves, to the carburetor adjacent the air inlet to the carburetor. With this intake formed of an area which when combined with the inlet area to the carburetor equals the area of inlet passageway in the carburetor at the point of greatest restriction, the proper velocity of air for mixing is maintained and consequently the attachment of the valve cooling system to the carburetor does not interfere with normal carburetor operations.

It is further intended to provide for automatic maintenance of the pre-determined air supply, necessary for the proper pre-determined velocity, in the event that the suction cooling inlet through the valves is reduced as may occur due to deposits of dirt and foreign matter therein.

Other objects and certain advantages will be more fully apparent from a description of the accompanying drawings, in which:

Figure 1 is a sectional vertical view taken through an internal combustion engine showing the present cooling system and apparatus applied to the "valve in head" type of engine.

Figure 2 is a side view of a valve guideway removed from the engine.

Figure 3 is a side view of an exhaust valve removed from the engine.

Figure 4 is a top plan view of Figure 3.

Figure 5 is a side view of the circulation control sleeve of the exhaust valve showing the same removed from the valve stem.

Figure 6 is a top plan view of a cylinder head showing the general arrangement of the main suction passageway relative to the valves.

Figure 7 is a sectional view taken on line 7—7, Figure 6, detailing a portion of the suction passageway with the valve guides and valves removed from the head.

Figure 8 is a side view partly in section of one of the guideways for the inlet valves.

Figure 9 is a longitudinal fragmentary sectional view taken through an internal combustion engine for illustrating the application of the present air cooling system to an engine having the valves on the side.

Figure 10 is a side view, partly in section, of an exhaust valve guideway in modified form for varying the air circulation.

In the application of the present invention to an internal combustion engine the suction created at the carburetor or gas intake manifold due to the suction or gas intake strokes of the pistons is utilized for drawing air from the region above the motor or within the valve casing or cover through the valves via an improved valve structure, circulating the air the length of the valve stem and against the head and thence by pipe connection to some portion of the intake passageway, preferably at the point of air entrance to the carburetor.

For the purpose of illustrating the apparatus or arrangement of parts used for accomplishing this air circulation through the valves, only those conventional parts which are necessary to an understanding of this apparatus are illustrated. Referring specifically to the drawings and particularly Figure 1, the cylinder block 11 includes any number of cylinders 12 depending on the type of motor being used, the present motor being of the six cylinder type as shown in Figure 6. Pistons 13 are mounted in the cylinders and operate the usual crank shaft (not illustrated), whereby each piston is operated or operates for gas intake strokes, compression strokes, power strokes, and expulsion or exhaust strokes. A cylinder head 14 is attached on the cylinder block and mounts the valve structure, this head including the inlet and exhaust passageways 15, 16 to the respective cylinders. Both the cylinder head and the crank case are of hollow cast structure providing water jackets about the cylinders, inlet and exhaust passageways and valve supporting portions.

The overhead or "in head" type of valve is illustrated in the main view of this application. A valve cover 17 is placed on the cylinder head and encloses the upper ends of the exhaust and inlet valves 18, 19 as well as the valve operating cam shaft 20 extended along and above the row of valves. Each valve including both the inlet and exhaust valves is mounted in a guideway 21 attached in a vertical bore 22 in the cylinder head and is extended above the upper side of the cylinder head and into the inlet or exhaust passageway as the case may be.

All of the gas inlet passageways 15 formed in the cylinder head extend in from one side of the block and are extended from the intake manifold 23 and carburetor 24. These passageways 15 open into a combustion chamber 25 formed in the head as a continuation of the cylinder in each case. The exhaust passageways 16 extend from the respective combustion chambers in the same manner but to the opposite side where they are connected to a common exhaust manifold (not shown). The valve guideway elements 21 extend into the respective inlet and exhaust passageways for the purpose of providing a considerable axial mounting and protection for the valves extended well along the length of the valves toward the heads thereof. The valves 18, 19 slidably mounted in the guideways have their tapered heads 26 disposed in the combustion chambers and seat against tapered valve seats 27 disposed about the margin of the entrance of the particular passageways into the combustion chambers.

Each valve guideway includes an attaching flange 28 disposed substantially intermediate of the ends of the sleeve-like structure, which flange 28 when the guideways are dropped into their respective bores lie in countersunk portions 29 in the top face of the cylinder head and are attached therein. Each valve guideway also includes an annular groove 30 just below the attaching flange and forming in conjunction with the cylinder head an annular passageway as a part of the general circulation passageway hereinafter set forth.

As will be apparent from Figures 6 and 7, the cylinder head includes a longitudinal bore 31 forming a passageway entirely through the cylinder head closed at both ends by screw means or plugs 32 and disposed through the centers of all of the valve mounting bores. This longitudinal passageway is connected laterally through the side of the cylinder head by means of a suction pipe 33 which drops down to the carburetor 24 for the purpose of applying the suction.

The cylinder head is cored about all of these passageways to form the conventional water jacket, the longitudinal passageway extending through sleeve-like portions of the main cylinder head casting. This longitudinal passageway 31 intersects in each instance the annular groove or passageway 30 formed in the guideways and consequently the single suction pipe 33 communicates with all of the annular grooves in the various valve guideways. In the instance of each exhaust valve guideway, a series of radial ports 34 are provided in the annularly grooved portions connecting the same to the internal bore of the guideway, whereas all of the inlet valves merely include the annular groove for the purpose of circulation to the exhaust valves. Moreover, each exhaust valve guideway includes an internal annular groove 35 adjacent the external groove, the purpose of which will be more apparent as the description progresses.

At this point it will be deemed advisable to note that the inlet valves are of standard construction, that is to say, do not require special structure for the purpose of this air cooling system and consequently will not be described more than to say that they are exactly similar to the exhaust valves in mounting and operation but do not include the hollow structural features for air circulation.

Each exhaust valve has a tubular sleeve-like stem 36, the valve therefore being entirely hollow except the head 26, the tubular stem structure permitting application of air to the rear side of the head portion centrally thereof. The bore of the stem is in communication with the annular internal groove 35 of the guideway by means of radial ports 36ª. For the purpose of providing longitudinal circulation of air through the valve stem, a circulation controlling sleeve 37 is telescopically mounted in the valve stem. This sleeve consists of a spread or bulged upper end 38 fitting snugly in the valve stem bore and having its lower end seated in a reduced diameter bore portion 39 of the valve stem bore in the head thereof. The mounting of this circulation control sleeve provides a space 40 between this element and the valve stem which is extended substantially from one end of the stem to the other.

The lower end of the inserted sleeve 37 is slotted as at 41 and the upper end is open from above. The valve is operated from above by means of the cam shaft 20 acting on operating head elements 42, 43 fixed to the upper ends of the valves, this head structure including appropriate arrangement for air inlet to the end of the valve and downwardly therethrough.

In the instance of each valve, an additional guideway 44 is provided in the form of a sleeve-like element having a flange 45 at its lower end for attachment to the upper face of the cylinder head, the cylinder head including a second countersunk portion 46 for receiving a depending portion of this mentioned additional guideway element. This additional guideway is of considerable diameter over the diameter of the valve stems and provides an enclosed space about the main valve stem guideway and the valve stem.

The operating head elements or collars 42, 43 are screwed onto the upper end of the valve stem, the lower one 43 being slidably mounted in the additional guideway element 44. A valve return spring 47 for maintaining the valve in closed position is disposed under compression between a seating depression in the underside of the last mentioned collar 43 and against the attaching flange 28 of the main valve guideway.

Ports 48 are provided in this collar extending inwardly from the sides into the spring seating portion as well as from above, the guideway 44 guiding this collar being related to permit exposure of these laterally disposed openings to the atmosphere when the valves are closed so that air can enter the spring space whereby there is no interference with valve operation. The side openings 48 also serve for application of a tool to the collar for adjustment thereof.

The upper collar 42 which is directly contacted by the cams and has a flat closed top is of hollow structure including a circumferential depression open from below. A series of ports 49 extend into this groove through the outer formed flange thereof and a series of ports 50 are extended through the inner flange or hub into the screw-threaded internal bore portion above the upper end of the valve stem, thereby opening the entire valve structure in the passageways to the atmosphere above the cylinder head. Although the valve cover 17 forms a complete protective closure for the valve operating mechanism, it is provided that air may enter this cover and consequently there is no interference with air supply to the valves from this region.

The suction connection pipe 33 extended to the carburetor is preferably attached below the Venturi tube or mixing chamber of the carburetor, that is, adjacent the inlet for the carburetor. The details of the carburetor are not described herein inasmuch as the carburetor may be of standard design with the exception of the structure herein described.

As is conventional in carburetors, there is a constriction at the point of the mixing chamber where the gasoline enters the carburetor and is vaporized. The area of this passageway is carefully calculated to provide the proper velocity for an efficient gas intake through the cylinders. In the adaptation of the present suction system for cooling the valves, this area has been taken into consideration and the combined areas of the inlet to the valve cooling suction pipe 33 and the actual area at the mouth 51 of the intake of the carburetor is exactly equal to the most constricted portion of the carburetor at the point of mixture. This has been arranged so that there will be no interference with the normal velocity of gas intake in the carburetor. However, it is appreciated that there will be some constriction occurring in the cooling passageway through the valves and in the pipe 33 due to the considerable amount of area which can receive dirt deposit and for this reason a means is provided at the carburetor for maintaining the exact pre-determined area of intake established by the combination of the suction inlet in the carburetor and the air cooling system inlet.

This maintenance is accomplished by means of a valve 52 located in the side of the carburetor below the mixing chamber which is seated on the inner side of the carburetor casing on the tapered seat 53 and held against its seat by means of a spring 54 compressed between a nut 55 on the outer end of the stem and the casing. This valve will open responsive to tendency toward velocity rise and will serve to keep the velocity uniform by maintaining a perfect balance between the areas of inlet and fullest constriction in the valve chamber.

In Figures 9 and 10, the present apparatus is shown applied to valves at the side of the engine. In this instance the position of the valves is reversed, that is to say, the stems 36 extend downwardly. The cylinder head 14 is flat since the valves 18, 19 are mounted in the cylinder block. Moreover the inlet and exhaust passageways 15, 16 to and from the cylinder are included in the block. Also the longitudinally extended bore 31 constituting the main suction passageway connecting all the valve guideway bores 22 is disposed longitudinally through the block.

The valve guideways are of substantially the same general construction as those described in the preceding form. They are in reversed position with the attaching flanges 28 thereof lying against an underside of the cylinder block, the upper ends thereof extending into the exhaust and inlet passageways. The arrangement of the main air suction passageway or bore 31 relative to the guideways is the same as in the preceding form. In this construction the circulation control sleeve 37 is omitted and only the tubular valve stem 36 is used in conjunction with other passageway arrangement.

The valves are maintained on their seats by means of springs 56 under compression between the underside of the block and against cupped washers 57 fixed upon the lower ends of the valve stems by means of rings 58 seated in annular grooves 59 in the valve stems. The lower end of each exhaust valve stem below the guideway includes a series of ports 60 which in addition to the open end of the bore permit entrance of the air upwardly through the exhaust valve stem. The air sucked in through these ports is forced against the back of the valve head which is closed as in the preceding form and thence passes outwardly and downwardly from the stem through inclined ports 61 entering into an annular groove 62 in the bore of the valve guideway.

Below this annular passageway a spiral groove 63 is laid in the bore of the guideway encircling the valve stem and communicating with the internal annular groove 35 adjacent the main suction air passageway 31. The air drawn upwardly through the valve by way of the lower ports 60 passes out of the valve stem through the inclined ports 61 into the annular space 62, thence winds around the valve stem through the spirally laid groove 63, enters the connected annular grooves and thence passes into the main suction bore extended longitudinally of the block.

*Description of operation*

When the motor is in operation, the suction strokes of the pistons are tending at all times by successive operation to draw air for gas formation through the carburetor into the cylinders, thus creating a velocity of considerable speed. This velocity, through the passageways previously described, creates an intake at the upper ends of the valves. The air is drawn from the region above the cylinder head and within the valve cover into the operating or contact collar 42 through the ports 49, 50, then downwardly through the circular control sleeve 37 entirely to the lower end thereof where the air is drawn forcibly against the head of the valve. Here there is no opportunity for entrance of dirt or the products of combustion for the reason that the passageway is closed and the valve head is cooled from the inside.

At the lower end of the valve the air passes out of the circular control sleeve 37 through the slots 41 in the base end thereof and moves upwardly between the circular control element and the valve stem. From this space it is drawn outwardly through the radial ports or apertures 36a in the valve stem wall into the annular internal groove 35 in the bore of the valve guideway, thence through the radial ports 34 into the external annular groove 30, then into the longitudinal straight passageway 31 in the cylinder head moving around the inlet valve guideways and having free passageway out through the laterally extended tubular pipe 33 which is connected to the carburetor 24.

The valve structure being tubular as described, a great amount of weight is eliminated and the valve stem is relatively light. Lightness of valve structure makes it unnecessary to put extremely high tension on the springs. By reducing the spring pressure a great deal of vibration is eliminated and the operation is much more silent than heretofore. With the air blown directly against the head of the valve, the valve head is kept at a low temperature as compared with the temperatures previously encountered. Any tendency toward pre-ignition is abolished and consequently there is an elimination of detonation and vibration as well as the resultant strains on the engine parts.

The outlet for the air current for the cooling system or the suction pipe 33 may be entered directly to the inlet manifold, to the mixing chamber of the carburetor, or to the main air inlet of the carburetor, preferably the latter. By the arrangement described there is no interference with normal carburetor operation but there is a definite assurance that the air cooling action will be taking place at all times when the engine is operated, for it is a normal function of the carburetor to create suction which is all that the present system requires. Ample air flow is provided, there being velocity sufficient to create pressure and a rapid movement of the air for displacement of the heat.

An engine equipped with this system will be much more efficiently operated in that pre-heating of the air supplied to the carburetor is a normal function of this system for the reason that the excess heat taken off the valves is utilized by return in the form of gas to the motor within the cylinders for a more perfect combustion. The valves operate at a low temperature and therefore perfect lubrication can be applied and carbon deposit is eliminated.

Having described my invention, I claim:

1. In an internal combustion engine, a cylinder block and head structure, a piston in said cylinder, exhaust and inlet passageways connected to said cylinder, a carburetor for supplying gas to said cylinder through said inlet passageway, valves controlling the respective passageways, the exhaust control valve including a passageway extending from one end of the stem thereof for air intake to the other or closed head end thereof and returning to an outlet port intermediate the length of the stem, a suction pipe connecting said outlet port of the stem to said carburetor below the mixing chamber thereof, said suction pipe area plus the intake area to the carburetor being equal to the most constricted area in the gas feed passageway to the cylinder, and a valve in the air intake to the carburetor mixing chamber adapted to automatically open and compensate for reduction in the area of the suction passageways in the valve for maintaining uniform velocity of air through the carburetor.

2. In an internal combustion engine, a cylinder block and head, a piston in the cylinder of said block, inlet and exhaust passageways extended to said cylinder, slidably mounted valves for controlling said passageways, a carburetor for supplying gas to said cylinder on the intake stroke of the piston, a hollow stem for said exhaust valve, said stem having a passageway extending from its outer end to the head and thence upwardly from the head and outwardly through radial outlet ports, a guideway element slidably mounting said valve, including adjacent internal and external annular grooves connected by ports adjacent to said valve stem ports, and a suction conduit connecting said groove and port arrangement to the gas inlet passageway.

3. In an internal combustion engine, a cylinder block and head structure, a piston in said cylinder, exhaust and inlet passageways connected to said cylinder, a carburetor for supplying gas to said cylinder through said inlet passageway, valves controlling the respective passageways, said exhaust valve including a passageway extending from one end of the stem thereof for air intake to the other or closed head end thereof and thence to an outlet port and a suction pipe connecting said outlet port to said carburetor, said suction pipe connected to the carburetor intake passageway independently of the normal intake therefor and below the mixing chamber, said suction pipe area plus the intake area to the carburetor being equal to the most restricted area in the gas feed passageway to the cylinder for non-interference with the pre-determined velocity of air flow through the carburetor.

4. In an internal combustion engine, a cylinder block and head, a piston in the cylinder of said block, inlet and exhaust passageways entering said cylinder, valves for controlling the respective passageways, a carburetor for supplying gas to the cylinder through the inlet passageway on the suction stroke of the piston, said exhaust valve having a tubular stem and a solid head, a circulation control sleeve mounted within the tubular stem having an enlarged upper end snugly fitting within the stem, the remainder of said control element providing a space in relation to the valve stem, ports at the base of said control element, and ports in the upper end of said valve stem below said enlarged upper end of said sleeve, said cylinder block including a passageway communicating with said latter ports, and a suction conduit extended from said latter passageway to the inlet passageway of the cylinder.

5. In an internal combustion engine, a cylinder block and head, a piston in the cylinder of said block, inlet and exhaust passageways entering said cylinder, valves for controlling the respective passageways, a carburetor for supplying gas to the cylinder through the inlet passageway on the suction stroke of the piston, said exhaust valve having a tubular stem and a solid head, a circulation control sleeve mounted within the tubular stem having an enlarged upper end snugly fitting within the stem, the remainder of said control element providing a space in relation to the valve stem, ports at the base of said control element, ports in the upper end of said valve stem, a guideway for said valve having an inner annular groove surrounding said latter ports and an adjacent outer annular groove connected to said inner annular groove by ports, and a suction conduit extended from said grooves to the intake passageway of the cylinder.

VICTOR F. ZAHODIAKIN.